United States Patent Office 2,921,369
Patented Jan. 19, 1960

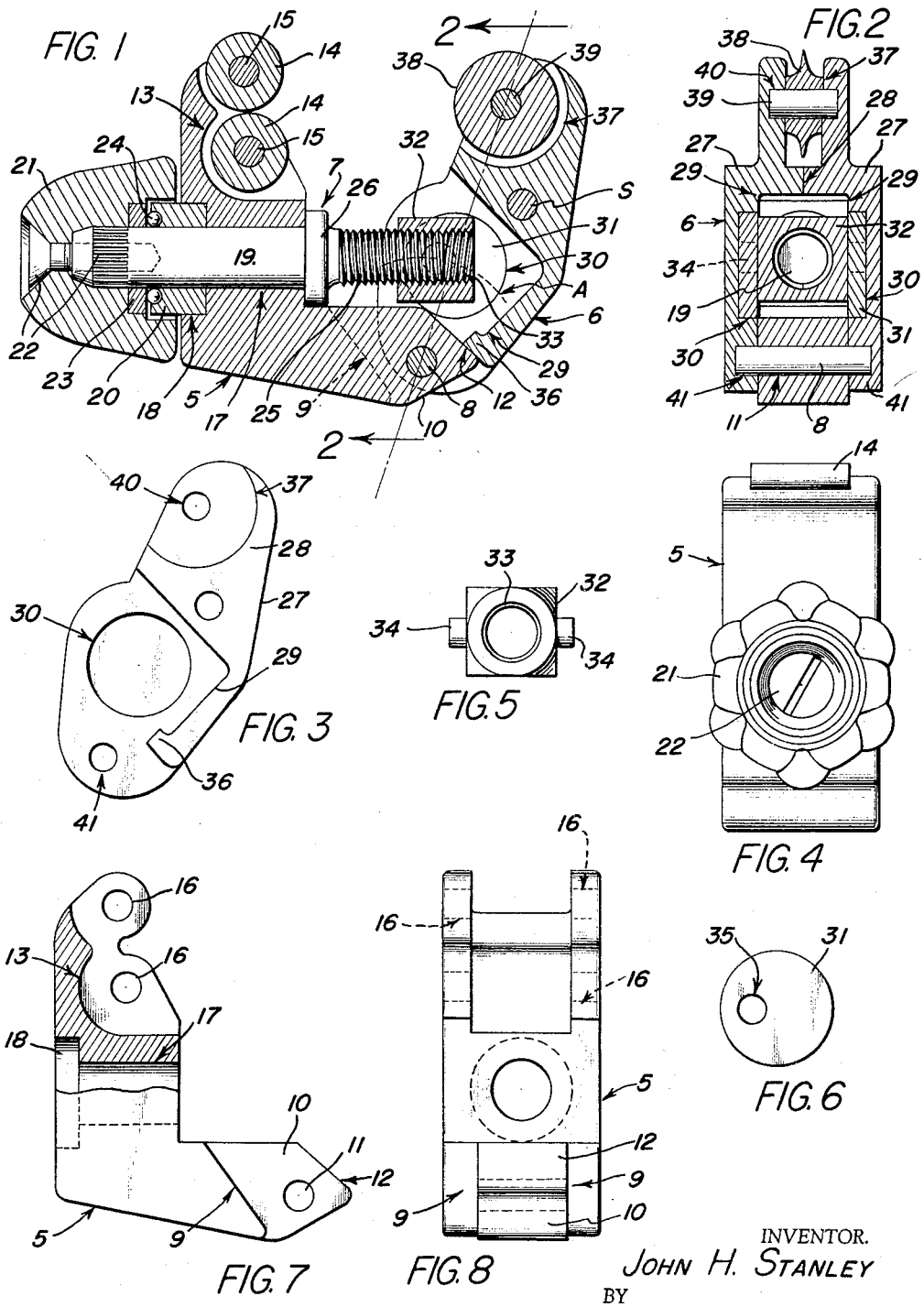

2,921,369

HAND CARRIED AND OPERATED TUBE CUTTER

John H. Stanley, Euclid, Ohio, assignor to Parker-Hannifin Corporation, Cleveland, Ohio, a corporation of Ohio Application January 28, 1959, Serial No. 789,629

11 Claims. (Cl. 30—102)

The invention relates generally to tube cutters and seeks to provide a simple and efficiently operable tube cutter adapted for being conveniently hand carried and hand operated.

An object of the invention is to provide a tube cutter of the character stated wherein are included a body having tube seat providing anvil roller means supported thereon, a cutter carrier arm swingably mounted on the body, and hand operable captive screw means mounted on the body and having connection with the arm for imparting movement thereto for moving the cutter toward or from a tube seated on the roller means, the parts being constructed and arranged in a novel manner for presenting all portions thereof in relatively close relation to the center line of a tube being cut, providing for close clearance in rotating the cutter about the tube, and permitting practical use of the cutter in close quarters.

Another object of the invention is to provide a tube cutter of the character stated wherein the body is L-shaped, the arm is swingably mounted at the free end of the L base and carries the cutter at its free end, and the screw means is mounted on the L upright in substantially perpendicular relation thereto and has its connection with the arm intermediately of the ends of the arm.

A further object of the invention is to provide a tube cutter of the character stated wherein the arm has a central recess into which a threaded end of the screw means projects, said threaded end being threadable in a nut which is pin connected with slide members slidable in slideways provided in the arm recess so that when the screw means is rotated in one direction or the other the nut will be caused to move along on the threaded end and cause the slide members to move and engage in their respective slideways in a manner for imparting movement to the arm in one direction or the other according to the direction in which the screw means is being rotated.

A still further object of the invention is to provide a tube cutter of the character stated wherein the slideways in the arm are in the form of circular bores and each slide member is in the form of a circular disk mounted for snug rotational sliding movement in one said bore, each said disk having a bore therein which is eccentrically disposed and in which a pin projection from the nut engages in movement imparting contact.

With the above and other objects in view that will hereinafter appear, the nature of the invention will be more clearly understood by reference to the following detailed description, the appended claims and the several views illustrated in the accompanying drawing.

In the drawings:

Figure 1 is a central longitudinal sectional view illustrating the improved tube cutter.

Figure 2 is a cross section on the line 2—2 on Figure 1.

Figure 3 is an inner face view of one of the mating half sections of the cutter carrying arm.

Figure 4 is a left end elevation of the structure shown in Figure 1.

Figure 5 is an end elevation of the internally threaded trunnion block.

Figure 6 is a face view of one of the eccentric discs.

Figure 7 is a side elevation of the main body member, parts being broken away and in section.

Figure 8 is a right end elevation of the part shown in Figure 7.

In the example of embodiment of the invention herein disclosed, the improved tube cutter is shown as including a main body or handle portion generally designated 5, a cutter carrying arm generally designated 6 and manually operable screw means generally designated 7 effective to bring about positive swinging movement of the arm in one direction or the other about its pivotal mounting at 8 on the body 5, as will be clearly apparent by reference to Figure 1.

The body 5 is cut away at its sides, as at 9, to provide an arm mounting nose extension 10 which is transversely bored at 11 to receive the arm mounting pivot pin 8, said nose extension also being shaped to provide a stop shoulder portion 12. The body 5 also is recessed at 13 to receive the parallel spaced anvil rollers 14 which are mounted on supporting shafts 15 received in accommodating bores 16. The body 5 also is equipped with a screw receiving bore 17 and a counterbore 18.

The screw means generally designated 7 includes a screw member 19 which is rotatably mounted in the body bore 17 and in a hardened bearing ring 20 mounted in the counterbore 18, and a turning knob 21 which is secured at 22 on the end of the screw member projecting through the ring 20. The knob 21 is counterbored to receive a hardened thrust ring 23 disposed to engage anti-friction bearings 24 received in a race provided in the opposing end of the hardened ring 20. At its other end, the screw member 19 is externally threaded at 25 and has an enlargement or shoulder 26 disposed to abut the handle or body in the manner clearly illustrated in Figure 1.

The arm 6 preferably is formed of mating half sections 27, as will be clearly apparent by reference to Figures 2 and 3 of the drawing. The mating half sections 27 have plane faces 28 which engage at a median line as illustrated in Figure 2, and said sections are recessed at 29 to straddle the body extension 10. The parallel wall portions provided by the recessing of the arm half sections 27 are bored at 30 to provide circular recesses in which to receive thrust applying disks 31, one said disk being shown in detail in Figure 6, and the mating sections 27 are secured together in the condition illustrated in Figures 1 and 2 by any suitable securing means, such as the screw means indicated at S.

A trunnion block or nut 32 is mounted in the arm recess and is internally threaded at 33 to receive the threaded end portion 25 of the screw member 19 which is projected into the arm recessing in the manner clearly illustrated in Figures 1 and 2. The block or nut 32 is equipped with lateral pin projections or trunnions 34 disposed to engage in the disk bore 33, said disk bores being placed eccentrically in the disks in the manner clearly illustrated in Figures 1 and 6.

It will be apparent by reference to Figures 1 and 3 that the arm 6 is provided with a stop shoulder 36 engageable with the stop shoulder 12 of the nose extension 10 of the body or handle 5 in the fully opened position of the arm illustrated in Figure 1. The arm sections also are recessed at 37 to receive the cutting wheel 38 mounted on the cross shaft 39 which is received at its ends in recesses 40 provided therefor in the arm sections, as best illustrated in Figures 2 and 3. It will also be apparent by reference to Figure 2 that the arm pivot pin 8 may also be received in recesses formed in the arm sections, the same being indicated at 41 in Figures 2 and 3.

It will be apparent by reference to Figures 1 and 7 of the drawings that the body or handle member generally designated 5 is L-shaped and the arm 6 is pivoted to the free end of the base of the L. The screw member 19 is mounted on the standard of the L with its axis disposed in substantially perpendicular relation to the L standard. In this manner, a very compact arrangement is provided wherein all parts of the cutter are as close as possible to the center line of a tube being cut, or in other words engaged between the parallel spaced anvil rolls 14—14 and the opposing cutter wheel 38. This provides very close clearance in rotating the cutter about a tube being cut and permits practical use of the device in close quarters.

With the particular arrangement shown in applicant's Figures 1 and 2, including the disks 31 mounted in snug rotational sliding movement in the bores 30 and the trunnions 34 of the block or nut 32 engaged in the eccentric bores 35 in the disks, the block or nut 32 may move in a straight line along the screw member 19 while the centers of the disks 31 move in an arcuate path A. In other words, as the screw member 19 is turned in one direction or the other, in its rotatable mounting on the arm 5, the block or nut 32 will be caused to move along the threaded end extension 25 in a straight line, the trunnions 34 serving to impart movement to the disks 31 and through the disks and their engagement in the bores 30 to the arm 6, swinging the same to move the cutting wheel 38 toward or from the anvil rollers 14 according to the direction in which the screw member is being turned. As the disks impart movement to the arm in the manner stated, they partake of a degree of rotation in the mounting bores 30 to permit the described straight line movement of the trunnions 34 and the swinging movement of the arm 6 and its disks 31 as indicated by the arcuate line A.

While a preferred example embodiment of the cutter structure is disclosed herein, it is to be understood that variations in the form and arrangement of the parts may be made without departing from the scope of the invention as defined in the appended claims.

I claim:

1. A tube cutter comprising a body, tube seat providing anvil roller means supported on said body, a cutter carrier arm swingably mounted on the body and having a cutter wheel thereon in position for being engaged with and disengaged from a tube seated on said roller means as the arm is swung in one direction or the other with relation to said body, a manually operable captive screw member having rotative bearing in said body and including a threaded end portion, a nut having therein a threaded bore in which the threaded end portion of the screw member is threadably engaged, said nut having a pin projection, a slideway in said arm, and a thrust applying member slidable in said slideway and having a bore therein in which said pin projection engages so that upon rotation of the screw member in one direction or the other the nut will be caused to move along the threaded end portion of the screw member and cause the thrust applying member to move in the slideway and impart thrust to the arm to swing it in one direction or the other according to the direction in which the screw member is being rotated.

2. A tube cutter as defined in claim 1 wherein there are included on the body and on the arm cooperative stop shoulders engageable to limit swinging movement of the free end of the arm away from the body.

3. A tube cutter as defined in claim 1 wherein the slideway in the arm is in the form of a circular bore and the thrust applying member is in the form of a circular disk mounted for snug rotational sliding movement in said circular bore, said disk having the pin receiving and engaging bore therein eccentrically disposed so that the axis of the engaging pin and bore can follow a straight line movement along the screw member while the disk center is partaking of an arcuate path movement with the swinging arm to which said disk is imparting thrust.

4. A tube cutter as defined in claim 1 wherein the body is L-shaped and the arm is swingably mounted on the body at the free end of the base of the L and the screw member is mounted on the L upright in substantially perpendicular relation thereto and has its connection with the arm disposed intermediately of the arm ends, the arm pivot being at one end of the arm and the cutter being carried at the other or free end of the arm.

5. A tube cutter comprising a body, tube seat providing anvil roller means supported on said body, a cutter carrier arm swingably mounted on the body and having a cutter wheel thereon in position for being engaged with and disengaged from a tube seated on said roller means as the arm is swung in one direction or the other with relation to said body, a manually operable captive screw member having rotative bearing in said body and including a threaded end portion, said arm having a central recess therein and into which the threaded end portion of the screw member is projected and which presents parallel wall portions one at each side of and spaced from said screw member threaded end portion, a nut having therein a threaded bore in which the threaded end of the screw member is threadably engaged within said arm recess, each said wall portion having a slideway therein, a thrust applying member slidable in each said slideway and having a bore therein, and said nut having a pin projecting from each side thereof and engaging in one thrust applying member bore so that upon rotation of the screw member in one direction or the other the nut will be caused to move along on the threaded end portion of the screw member and cause the thrust applying members to move in their respective slideways and impart thrust to the arm to swing it in one direction or the other according to the direction in which the screw member is being rotated.

6. A tube cutter as defined in claim 5 wherein there are included on the body and on the arm cooperative stop shoulders engageable to limit swinging movement of the free end of the arm away from the body.

7. A tube cutter as defined in claim 5 wherein the slideway in each of the parallel arm wall portions is in the form of a circular bore and each thrust applying member is in the form of a circular disk mounted for snug rotational sliding movement in one said circular slideway bore, and each said disk has the pin receiving and engaging bore therein eccentrically disposed so that the axis of the engaging pins and bores can follow a straight line movement along the screw member while the disk centers are partaking of an arcuate path movement with the swinging arm to which said disks are imparting thrust.

8. A tube cutter as defined in claim 5 in which the cutter carrier arm is composed of opposed mating half sections recessed to cooperatively form the central recess into which the threaded end portion of the screw member and the nut project and also recessed to receive and mount end portions of a pivot shaft on which said arm is swingably mounted on the body and also recessed to receive and mount end portions of a shaft on which the cutter wheel is rotatably mounted.

9. A tube cutter as defined in claim 5 wherein the slideway in each of the parallel arm wall portions is in the form of a circular bore and each thrust applying member is in the form of a circular disk mounted for snug rotational sliding movement in one said circular slideway bore, and each said disk has the pin receiving and engaging bore therein eccentrically disposed so that the axis of the engaging pins and bores can follow a straight line movement along the screw member while the disk centers are partaking of an arcuate path movement with the swinging arm to which said disks are imparting thrust, said arm being composed of opposed mating half sections recessed to cooperatively form the central recess into which the threaded end portion of the screw member and the nut project and also recessed to receive and mount end portions of a pivot shaft on which said arm is swingably mounted on the body and also recessed to receive and mount end portions of a shaft on which the cutter wheel is rotatably mounted.

10. A tube cutter as defined in claim 5 wherein the body is L-shaped and the arm is swingably mounted on the body at the free end of the base of the L and the screw member is mounted on the L upright in substantially perpendicular relation thereto and has its connection with the arm disposed intermediately of the arm ends, the arm pivot being at one end of the arm and the cutter being carried at the other or free end of the arm.

11. A tube cutter comprising a body member, a carrier arm member swingably mounted on said body member, roller means mounted on one of said members for providing a tube seat, a cutter wheel mounted on the other of said members in opposition to said roller means, a manually operable captive screw member having rotative bearing in said body member and including a threaded end portion, a nut having therein a threaded bore in which the threaded end portion of the screw member is threadedly engaged, said nut having a pin projection, a slideway in said arm member, and a thrust applying member slidable in said slideway and having a bore therein in which said pin projection engages so that upon rotation of the screw member in one direction or the other the nut will be caused to move along the threaded end portion of the screw member and cause the thrust applying member to move in the slideway and impart thrust to the arm member to swing it in one direction or the other according to the direction in which the screw member is being rotated.

No references cited.